United States Patent [19]
Pound et al.

[11] Patent Number: 5,881,672
[45] Date of Patent: Mar. 16, 1999

[54] DEVICE AND METHOD FOR APPLICATION OF COLLARS TO ANIMALS

[75] Inventors: J. Mathews Pound; Craig A. LeMeilleur, both of Kerrville, Tex.

[73] Assignee: The United States of America as represented by the Department of Agriculture, Washington, D.C.

[21] Appl. No.: 848,146

[22] Filed: Apr. 28, 1997

[51] Int. Cl.⁶ .................................................. A01K 29/00
[52] U.S. Cl. ........................................ 119/174; 606/117
[58] Field of Search ................................. 119/174, 856; 606/117

[56] References Cited

U.S. PATENT DOCUMENTS

| | | | |
|---|---|---|---|
| 216,468 | 6/1879 | St. Mary | 606/117 X |
| 4,536,933 | 8/1985 | Furutsu | 606/117 X |
| 4,738,258 | 4/1988 | Cohr et al. | 606/117 |
| 5,141,514 | 8/1992 | van Amelsfort | 606/117 |

*Primary Examiner*—Robert P. Swiatek
*Attorney, Agent, or Firm*—M. Howard Silverstein; Randall E. Deck; John D. Fado

[57] ABSTRACT

An apparatus and method for the application of collars to deer and other wild or domestic animals. The apparatus may be adapted for use with collars formed from flexible, relatively non-resilient material which have attachable ends, as well as collars formed from resiliently coiled materials. The apparatus includes a support assembly for holding a collar in an open position with its ends spaced apart from one another, and a trigger for effecting application of the collar when an animal places its neck over the support. When flexible, non-resilient collars are employed, the support is also adapted to propel at least one end of the collar about the animal's neck and contact the opposite end of the collar. The apparatus may also be employed in combination with an animal feeder or bait station to attract animals in the wild.

51 Claims, 6 Drawing Sheets

DEVICE AND METHOD FOR APPLICATION OF COLLARS TO ANIMALS

BACKGROUND OF THE INVENTION

The invention relates to a device and method for the unattended, automatic, animal-activated application of collars to deer and other wild or domestic animals.

Many diseases are transmissible to man and animals by ectoparasites such as ticks. Because some wildlife species, such as white-tailed deer, are capable of propagating and harboring large populations of these ectoparasites, an effective strategy for the prevention of disease transmission should include treatment of animals, including wildlife, for the control of ectoparasites. Yet, the treatment of significant numbers of animals, especially wildlife that are not easily captured or otherwise able to be handled and treated directly, for control of these ectoparasites remains a difficult problem.

In areas where an effort is being made to eradicate ticks, the inability to control ticks on wildlife can be a critical factor to the success of the program. For example, cattle ticks were eradicated from the United States in the 1950's, and a quarantine zone was established along the Texas-Mexico border between Del Rio and Brownsville, Tex. to prevent reinfestation of U.S. cattle herds. Yearly outbreaks of ticks that occur in the quarantine zone are controlled by dipping of cattle and by vacating infested pastures. However, increased populations of white-tailed deer, elk, exotic deer, antelope and other marginal host animals in the region is complicating the eradication effort, and in some areas has prevented eradication on premises reinfested with the ticks. For other ectoparasites such as black-legged ticks, the vectors of Lyme disease, wildlife, and white-tailed deer in particular, are the primary hosts for adult ticks. The ability to control these ticks on deer would therefore be a valuable tool in the management of Lyme disease.

In U.S. Pat. No. 5,367,983, we disclosed a device and method for feeding and applying pesticides onto animals, including deer. That device incorporates vertical support members carrying pesticide applicators which the animal contacts in the course of feeding, thereby applying the pesticide to the neck and head of the animal. While the device has demonstrated effectiveness for the control of ticks and other parasites on wildlife for prolonged protection over extended periods, the animals must intermittently return for repeated applications.

Pesticide impregnated collars are commonly used for the control of ticks and other parasites on domestic animals. However, the application of these collars is primarily limited to domestic pets. Application to wildlife such as deer has been impractical and highly labor intensive, requiring the trapping and/or tranquilizing of target animals.

SUMMARY OF THE INVENTION

We have now developed an apparatus and method for the application of collars to deer and other wild or domestic animals. The apparatus may be adapted for use with collars formed from flexible, relatively non-resilient material which have attachable ends, as well as collars formed from resiliently coiled materials. The apparatus includes a support assembly for holding a collar in an open position with its ends spaced apart from one another, and a trigger for effecting application of the collar when an animal places its neck over the support. When flexible, non-resilient collars are employed, the support is also adapted to propel at least one end of the collar about the animal's neck and contact the opposite end of the collar. The apparatus may also be employed in combination with an animal feeder or bait station to attract animals in the wild.

In accordance with this discovery, it is an object of this invention to provide an apparatus and method for applying collars to the neck of an animal.

It is also an object of this invention to provide an apparatus and method for applying collars to wild animals, particularly those species which may be antlered.

Another object of this invention is to provide an apparatus and method for applying pesticide impregnated collars to animals for the sustained control of ectoparasites including insect and acarine pests and ticks.

Yet another object is to provide an apparatus and method for applying pesticide impregnated collars to animals to reduce populations of free-living ticks and thereby decrease the risk of infection, especially to humans, with the tick-borne causative agents of Lyme disease, ehrlichiosis, and granulocytic ehrlichiosis.

A further object of this invention is to provide an apparatus and method for applying identification, medicament impregnated, and/or tracking collars to animals for studying, monitoring, or managing animal populations.

A still further object of this invention is to provide an apparatus and method for automatically applying collars to animals without the need for tranquillizing, trapping, restraining, or traumatizing the animals.

These and other objects and advantages of the invention will become readily apparent from the ensuing description.

REFERENCE CHARACTERS 10 sizing arm
11 applicator arm
13 frame
14 releasable catch
15 trigger
16 slave solenoid
17 cable
18 support stand
19 collar detector
20 collar
21 collar first end
22 collar second end
30 receptacle
31 receptacle bottom wall
32 receptacle side wall
33 receptacle opening
34 supply bin
35 support stand
36 shield
41 hinge 42 accelerant (torsion spring)
43 torsion spring first end
44 torsion spring second end
45 extension coil
46 throwing arm
47 hinge
50 hinge
51 sizing arm first branch
52 sizing arm second branch
53 extension coil
54 accelerant (compression coil)
60 support
61 first upright arm
62 second upright arm
63 first releasable catch
64 second releasable catch
65 trigger
70 collar
71 collar first end
72 collar second end
80 support
81 reciprocating arm
82 trigger
83 second shield
90 collar

DETAILED DESCRIPTION

The apparatus of this invention is designed for the application of collars onto animals. While the device may be used for applying collars to a wide variety of animals, including domestics, it is particularly valuable for collaring wild or captive animals, especially those species which may have antlers or horns. Without being limited thereto, animals which may be collared include deer, such as white-tailed deer and red deer, antelope such as black-buck antelope, and elk, as well as sheep, goats, swine and cattle.

The apparatus may be adapted for use with collars formed from a variety of different materials, including those conventional in the art. In the preferred embodiment, the collars (described in greater detail hereinbelow) are formed from a flexible and relatively non-resilient material. To secure the collar about the neck of the animal, the ends of the collars must be attachable or adherent to one another. This may be satisfied, for example, by providing the ends with cooperating hook and loop type fastening strips or coating the ends with a conventional contact cement or glue. As will be described in greater detail further hereinbelow, in accordance with another, alternative embodiment, the collars may be formed from a resiliently coiled material which tends to form a coil in its untensioned or unrestrained state.

In the preferred embodiment for use with the above-mentioned flexible collars having attachable ends, the apparatus generally includes a support having a pair of opposed arms, each releasably supporting one end of the open collar. These arms should be spaced apart a sufficient distance to allow a target animal to pass its neck therebetween. One of the arms is adapted to rapidly propel the end of the collar thereon toward the opposing arm and in contact with the other end of the collar. To effect propulsion in this manner, the arm itself may be movable or it may include an accelerant. A trigger, which may be automatically or manually controlled, is provided for activating the propelling arm in response to the presence of an animal placing its neck between the arms and over the collar. Thus, when the trigger is activated, an end of the collar is propelled about the neck of the animal, and contacts with and attaches to the other end of the collar.

Figure 1:
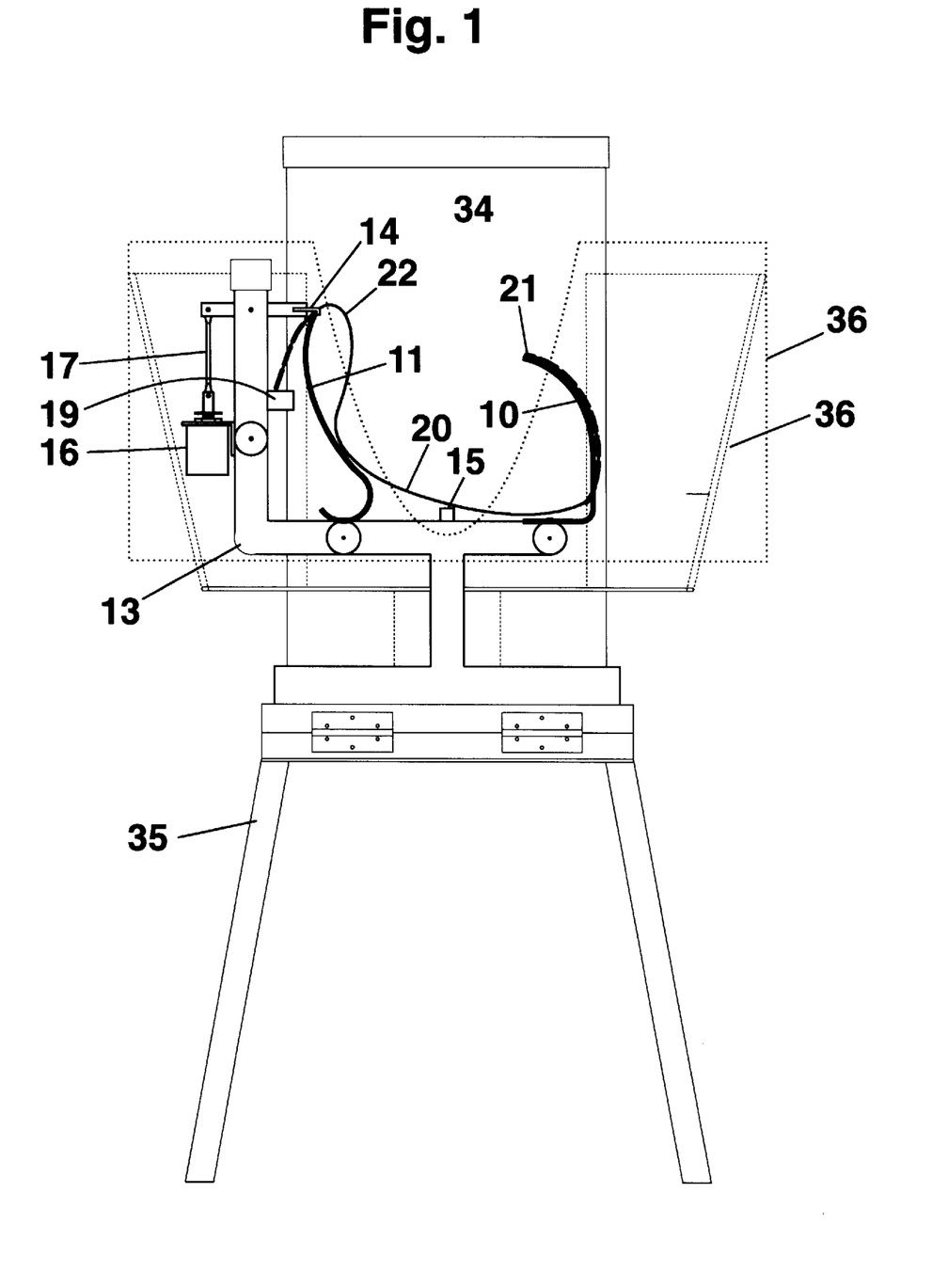
FIG. 1 is a front end view of a first collaring apparatus of the preferred embodiment.
Figure 2:
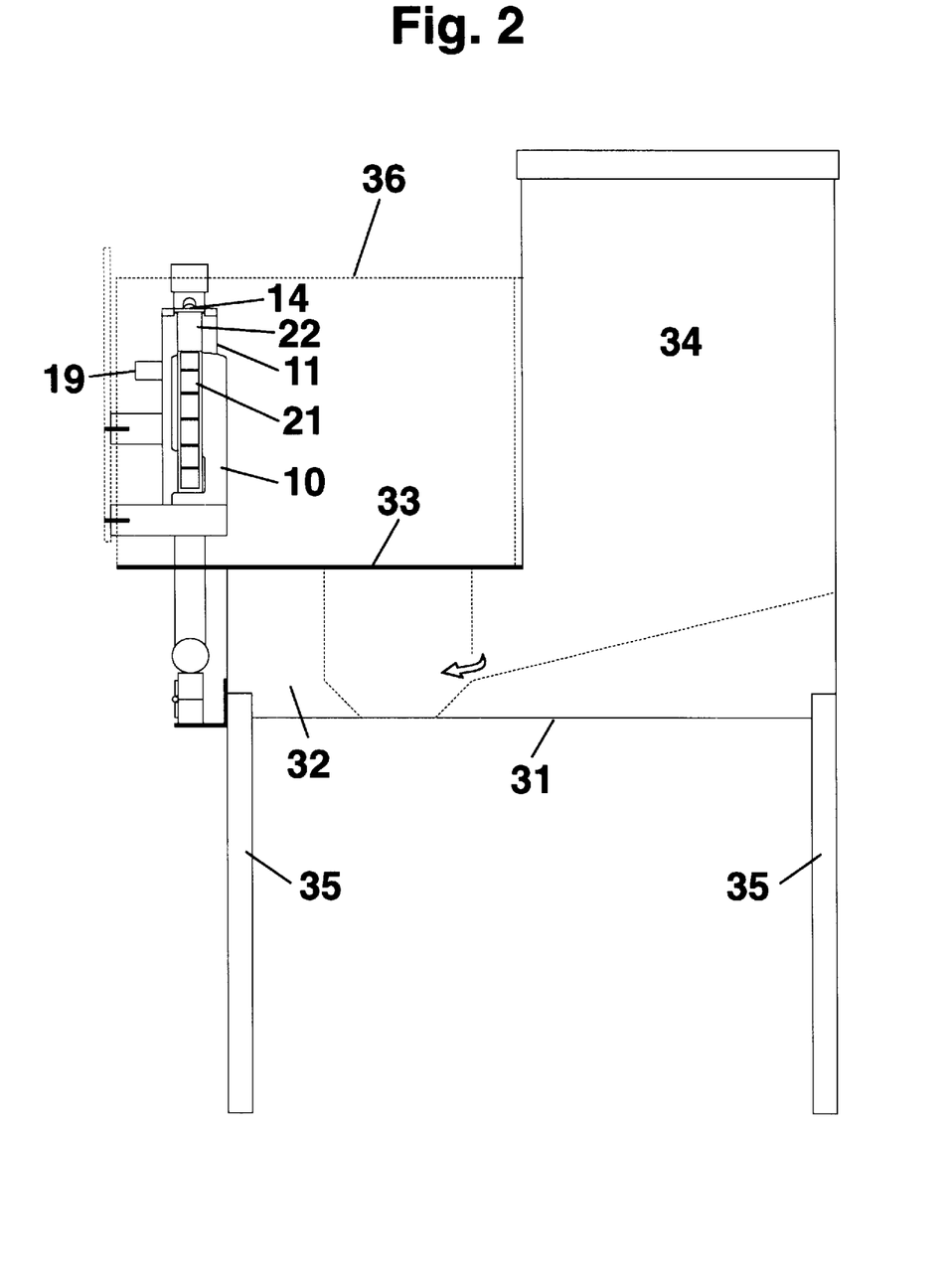
FIG. 2 is a side view of the apparatus of FIG. 1 in combination with an animal feeder.

FIGS. 1 and 2 show a first apparatus constructed in accordance with the preferred embodiment. The apparatus includes a support having sizing arm 10 and opposing applicator arm 11 attached to frame or base 13. During use, a collar 20 is disposed on the apparatus with a first end 21 releasably supported on sizing arm 10, and a second end 22 releasably supported on applicator arm 11. In this configuration, applicator arm 11 is formed from a resilient or elastic material, such as a flexible metallic or molded plastic or fiberglass spring, which may be deflected under force from its rest position in a direction spaced farther away from sizing arm 10, which is fixed. Applicator arm 11 should be sufficiently strong to rapidly propel collar end 22 toward sizing arm 10 when it is released. The distance between the sizing arm 10 and applicator arm 11 while in this deflected position (shown) may vary, but should be sufficient to allow passage of the target animal's neck therebetween.

The size and disposition of sizing arm 10 and applicator arm 11 are not critical. However, it is preferred to position both of the arms, and particularly the sizing arm 10, in an upright position. In a particularly preferred embodiment, at least the upper portion of sizing arm 10 is inclined inwardly toward the applicator arm 11. Positioning the sizing arm 10 in this manner facilitates resting the first end 21 of the collar on the outside surface of the sizing arm 10, and enhances attachment of the ends 21 and 22 of the collar to one another. The length of the arms may be varied to accommodate different target animals, but the applicator arm 11 is preferably selected to extend slightly above the height of the neck of the largest target animal anticipated. Both arms should have flat surfaces of sufficient width to readily support the width of the collar 20 thereon without slippage. As shown in FIG. 2, sizing arm 10 may also include a cutout portion or slot at its lower end to facilitate suspending the collar between the arms without twisting, and to prevent the collar from catching on the arm after it is applied to a target animal.

Applicator arm 11 may be retained under tension in the deflected position, also referred to as the cocked position, by a releasable catch 14, which is positioned adjacent to and in contact with the applicator arm 11 in the deflected or cocked position. Although the catch 14 is shown as a pivotable hook engaging the applicator arm 11, it is envisioned that other catches could be used, including but not limited to pawls or electromagnets, the latter requiring that the applicator arm include a cooperating metallic strip.

To release the applicator arm 11 and propel the second end 22 of the collar 20 into engagement with the first end 21 of the collar on sizing arm 10, the apparatus is provided with a trigger 15. Catch 14 is thus releasable in response to activation of trigger 15, moving out of contact with applicator arm 11. Without being limited thereto, trigger 15 is preferably a pressure activated switch or plunger, positioned on the frame 13 between the sizing arm 10 and applicator arm 11 so as to be activated upon contact by the neck of a target animal. Trigger 15 communicates with slave solenoid 16, which is attached by cable 17 to pivotable catch 14. In the event of using an electromagnetic catch, the trigger need only break the circuit serving the magnet to deactivate the same and release applicator arm 11.

A variety of different triggers may be used, and include not only automatic triggers activated by the target animals, but also manually operated triggers. Other automatic triggers may include conventional cooperating light beam generators and sensors, positioned on opposite sides of the space between the applicator arm 11 and the sizing arm 10 so as to pass an uninterrupted beam of light therebetween. The trigger would only be activated when the light beam is interrupted, such as by a target animal passing its neck between the arms. Alternatively, manually operated triggers may be employed when only selected animals are to be collared, or when collaring domestic animals. For instance, trigger 15 may be replaced with a remotely operated trigger, such as a conventional electronic or radio controller with slave motors or solenoids. Radio controlled triggers are particularly preferred for the selective collaring of wildlife.

Repeated application of collars to animals already wearing a collar may be prevented by use of optional sensors 19 effective for detecting an existing collar on an animal as it places its head between the arms. Upon detection of an existing collar, the sensor would deactivate trigger 15. Without being limited thereto, suitable sensors may include a radio receiver focused to detect the signal from a transponder included on the collars, a light beam generator and sensor positioned to detect a reflected light beam from collars provided with a reflective coating, conventional metal detectors positioned to detect a metallic or metal impregnated collar, or conventional bar code readers positioned to detect collars labeled with bar codes.

Although the collaring apparatus of this invention may be provided and used as a stand alone device, in the preferred embodiment, it is used in combination with an optional animal feeder, or a bait or attractant station. This is particularly preferred when collaring wild animals. Combination with a feeder or bait station not only serves to attract the animals to the collaring device, but also causes the animals to properly position their head and neck for collar application. A suitable feeder/bait station is shown in FIGS. 1 and 2 as a receptacle 30 for either an animal feed such as corn, or a bait or attractant such as salt. Receptacle 30 includes bottom and side walls, 31 and 32, respectively, and an opening 33 at the top thereof to allow the animal to access to the feed or bait therein. When the apparatus is to be used as a feed station, an optional container or supply bin 34 may be positioned within receptacle 30 for dispensing feed into the receptacle. An example of a suitable receptacle for use herein is described in U.S. Pat. No. 5,367,983, the contents of which are incorporated by reference herein.

The collaring apparatus should be positioned adjacent to receptacle 30 with the sizing arm 10 and applicator arm 11 adjacent to the opening 33, such that an animal will pass its neck between the arms to access the feed or bait. Further, the sizing arm 10, applicator arm 11, and the upper surface of frame 13 with trigger 15 thereon, should be positioned above both the ground and the opening 33 a distance sufficient to cause the target animal to activate the trigger as it accesses the feed or bait. Support stands 18 and 35 may also be added to allow the collaring apparatus and receptacle 30 to be positioned at a suitable distance above the ground for ease of access by the target animal, as well as to prevent access by small non-target animals and rodents.

An optional shield 36 is preferably positioned about the side walls 32 of the receptacle 30 effective to prevent an animal access to said feed or bait in the receptacle 30 except through the collaring apparatus. By extending a shield 36 between the sides of the collaring apparatus and the side walls 32, the animal can only access the feed or bait in receptacle 30 by passing its neck between the sizing arm 10 and applicator arm 11. Suitable shields may be constructed, for example, from plastic, glass, mesh, fence, or metal, although materials not blocking the animal's vision are preferred for collaring skittish animals such as deer.

While new collars may be manually placed on the apparatus after each application, it is envisioned an optional automatic collar feeding mechanism may be used. For example, one or more collars may be provided in a roll on an axle of a collar positioning assembly positioned adjacent to top of applicator arm 11. A suitable collar positioning assembly would include a motor for turning the axle to dispense a fresh collar onto and down the inner surface (facing the sizing arm 10) of applicator arm 11. The motor may also be controlled by activation of trigger 15, with a suitable time delay to allow application of the collar and resetting of the applicator arm, described below. A track may be provided for guiding the collar across the space between the applicator arm 11 and sizing arm 10, through the cutout or slot in the lower portion of sizing arm, and then onto the outer surface of the sizing arm, as it is dispensed from the roll. An automatic cutting mechanism may be provided adjacent to the outlet from the roll to cut the dispensed collar from a continuous roll of collars. An automatic retraction mechanism may also be provided for resetting applicator arm 11 from the deflected, position, and if necessary, for resetting catch 14 and/or any other components. For example, a suitable retraction device may include a pneumatic or hydraulic arm with an extendible catch or hook for contacting and retrieving the applicator arm, or a small motor driven winch with a cable attached to the arm. The retraction device could also be controlled by activation of trigger 15, time delayed to follow the collar application sequence. The skilled practitioner will recognize that other collar feeding mechanisms could also be used.

In the alternative to constructing the applicator arm 11 from a resilient spring-like material as described above, the arm may be pivotally attached to the frame 13 at its lower end, with a discrete accelerant provided for rapidly propelling or swinging the arm toward sizing arm 10. The function of this device is similar to the embodiment of FIGS. 1 and 2, with the rapid propulsion of the applicator arm 11 from its cocked position, spaced farther away from sizing arm 10, toward the sizing arm, in turn propelling the end 22 of collar 20 into contact with end 21.

Figure 3:
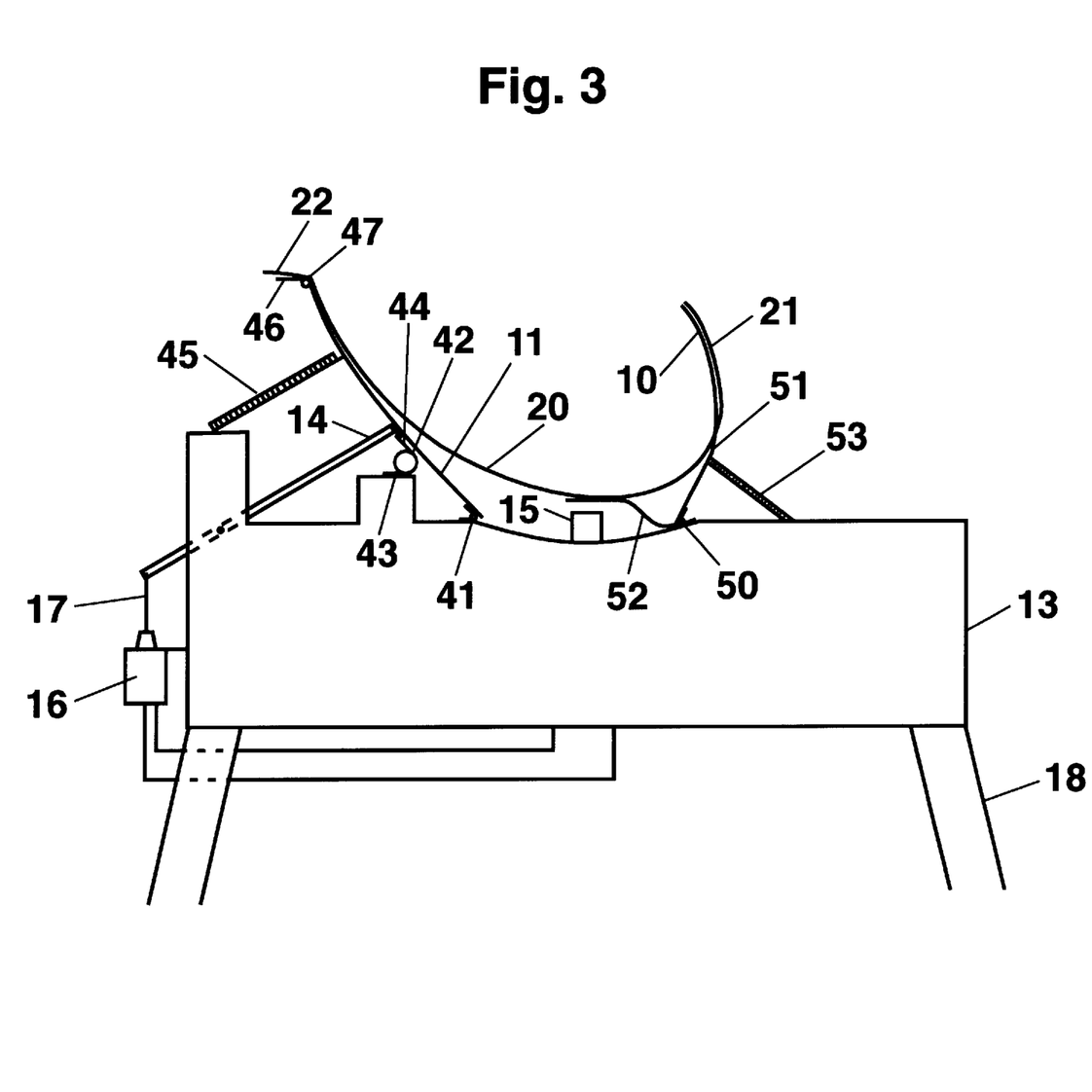
FIG. 3 is an end view of a second collaring apparatus of the preferred embodiment.

As shown in detail in FIG. 3, in this embodiment applicator arm 11 may be constructed of a relatively rigid material and is pivotally attached at its lower end to frame 13 with hinge 41. The axis of hinge 41 should be perpendicular to the plane of the collar 20. An accelerant 42 is positioned adjacent to the applicator arm 11 in its cocked position for propelling the applicator arm toward sizing arm 10. A variety of accelerants are suitable for use herein and include but not limited to, high tension springs, such as torsion springs, compression coils and spiral coils, pneumatic cylinders, or pressurized gas cartridges. The accelerants may be positioned on frame 13 adjacent to the outside surface of the applicator arm 11. In this position, each of these accelerants function by thrusting the applicator arm 11 from its cocked position toward the sizing arm 10. Alternatively, accelerants such as extension springs, weighted pulleys, or pneumatic cylinders, may be connected to the inside surface of the applicator arm 11, for drawing or pulling the arm toward sizing arm 10. The skilled practitioner will recognize that, depending upon the accelerant selected, the catch 14 may be omitted. For instance, when using pressurized gas cartridges, the trigger 15 may activate a valve on the cartridge or puncture a cartridge seal. Because no force is applied against the applicator arm 11 prior to activation of the trigger, a catch would not be necessary.

Accelerant 42 may be positioned at any point along the length of the applicator arm 11, or hinge 41 itself may be spring loaded. However, in the particularly preferred embodiment shown in FIG. 3, the accelerant 42 is a torsion spring positioned intermediate the hinge 41 and the far end of the applicator arm 11. When the applicator arm 11 is in the cocked position as shown in FIG. 3, one end 43 of the spring contacts and applies force against the frame 13, while the second end 44 of the spring contacts and applies force against the applicator arm 11. Upon release of catch 14, the spring forces the applicator arm 11 to swing toward the sizing arm 10, propelling the collar 20. Moreover, by positioning the torsion spring a sufficient distance from the hinge 41, the second end 44 of the spring may swing clear of and be removed from contact against the applicator arm 11, after the catch 14 has been released and the applicator arm has moved toward the sizing arm 10. Thus, any force directing the applicator arm 11 toward the sizing arm 10 is relieved after the collar has been applied, and the applicator arm 11 is prevented from being forced against the target animal's neck.

An optional first retraction mechanism may also be provided to actively move or retract the applicator arm 11 away from the sizing arm 10 and back toward the cocked position following the application of the collar. Removing the applicator arm 11 from the vicinity of the target animal's neck in this manner will reduce damage to the applicator arm by the animal as it withdraws from the apparatus, and reduce the opportunity for the collar to snag on the arm. As shown in FIG. 3, the first retraction mechanism is preferably a relatively weak extension coil 45 connected at opposite ends to frame 13 and the applicator arm 11. Other retraction mechanisms which are suitable for use herein include but are not limited to pneumatic or hydraulic cylinders or weighted pulleys. In any event, the force applied by the retraction mechanism in the direction away from the sizing arm should be greatly reduced relative to the force applied to propel the applicator arm toward the sizing arm.

In a further variation, applicator arm 11 may include an optional throwing arm 46 attached to its upper terminal end at pivot or hinge 47 (FIG. 3). Although shown on the applicator arm 10 of the apparatus of FIG. 3, it is understood that a hinged throwing arm may be included on the applicator arm of the apparatus of FIGS. 1 and 2 as well. After release of catch 14, applicator arm and throwing arm are propelled toward sizing arm 10. As the throwing arm 46 passes over the animal's neck its momentum causes it to swing about hinge 47, increasing the acceleration or propulsion of the end 22 of the collar. Furthermore, the swinging action of the throwing arm 46 effectively carries the end 22 of the collar over the target animals neck in contact with the end 21 of the collar on upper inclined portion of sizing arm. Contact between the ends of the collar is therefore enhanced.

Modifications to the apparatus for use with the flexible collars may also be made to the sizing arm 10. As shown in FIG. 3, in a particularly preferred embodiment, sizing arm 10 is pivotally attached to frame 13 at pivot or hinge 50, and is somewhat L-shaped with diverging first and second branches 51 and 52, respectively. First branch 51 extends upwardly for releasably supporting the first end 21 of collar 20 thereon. The first branch 51 is substantially the same size and shape as the previously described sizing arm of FIGS. 1 and 2, and is preferably inwardly inclined as well. Second branch 52 extends inwardly toward the applicator arm 11 (preferably approximately horizontally) below the inclined upper portion of the first branch 51, and is sufficiently long as to be contacted by the target animal's neck as it passes between applicator arm 11 and first branch 51. In this embodiment, the sizing arm 10 is normally at a first, rest position, where branch 51 is spaced sufficiently apart from the applicator arm 11 to allow a target animal to pass its neck therebetween. As the animal passes its neck between the arms, it contacts and depresses the second branch 52, thereby drawing the first branch 51 with collar end 21 thereon closer to the applicator arm 11 and over the neck of the animal. This allows a more precise fit of the collar with less slack about the target animal's neck upon activation of the trigger 15. The positioning of the trigger 15 relative to the second branch is not critical, although it may be positioned directly below the second branch 52 so as to be contacted and activated thereby as the second branch is depressed by the target animal.

When using the above described pivoting sizing arm 11, a second optional retraction mechanism may be attached to the sizing arm 10 for retracting the sizing arm back to its first, rest position following the application of the collar. This provides similar advantages as the first retraction mechanism, reducing damage to the sizing arm by the animal as it withdraws from the apparatus, and reducing the possibility of the collar from snagging on the sizing arm. This second retraction mechanism may be constructed in the same manner as the first retraction mechanism on applicator arm 11. Without being limited thereto, the second retraction mechanism is preferably an extension coil 53 connected at its opposite ends to frame 13 and the first branch 51 of sizing arm 10. The second retraction mechanism should be sufficiently strong to effectively retract the sizing arm as the target animal lifts its head and removes the downward force against second branch 52 of the sizing arm 10, but it should not be so strong as to inhibit the target animal from depressing the second branch 52.

Figure 4:
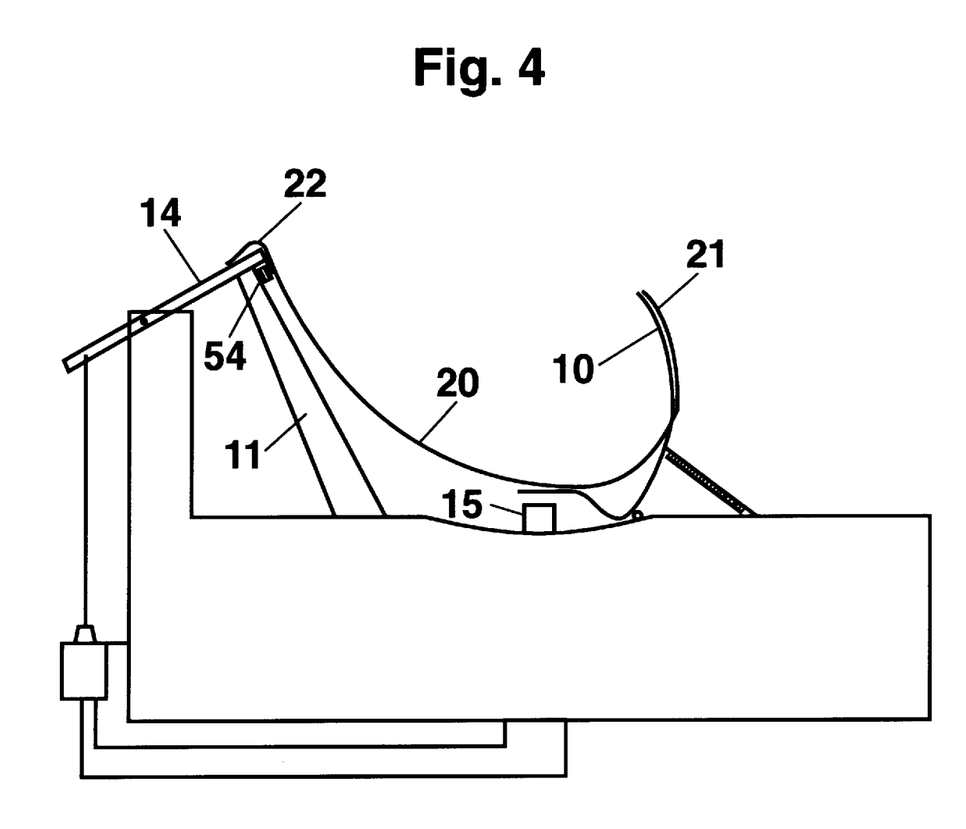
FIG. 4 is an end view of a third collaring apparatus of the preferred embodiment.

Another modification of the apparatus for use with the flexible collars is shown in FIG. 4. Generally, this apparatus functions in a manner similar to the devices shown FIGS. 1, 2 and 3. However, rather than the applicator arm 11 being movable, the applicator arm 11 is stationary and includes an accelerant 54, such as a compression coil 54, which acts directly upon the second end 22 of collar 20. Suitable accelerants include those described above for propelling the applicator arm. Obviously, catch 14 would be positioned to releasably retain the accelerant, and/or trigger 15 would function to activate the catch or otherwise release the accelerant 54.

Collars used in the preferred embodiment may be formed from any flexible, supple, and relatively nonresilient material. A variety of materials are suitable for use herein, including but not limited to plastics, synthetic or natural fabrics such as nylon or cotton, rubber, or leather. Soft materials minimize chafing about the animal's neck and are generally preferred. The shape of the collar is not critical and it may have a round or flat cross section. Collars with flat cross sections are generally preferred as they provide a greater surface area for contact between the opposing ends.

As mentioned above, the ends 21 and 22 of the collar 20 must be attachable or adherent in order to secure the collar after it is propelled around the subject animal's neck. In the preferred embodiment, the ends 21 and 22 are provided with cooperating opposing hook and loop type fasteners such as VELCRO strips (the hook or loop positioned being positioned on the inside surface of one end, and the other of the hook or loop being positioned on the outside surface of the other end) or a conventional contact cement or glue. Whichever attachment mechanism is used, it should be extended sufficiently along the length of at least one of the ends 21 and 22 to allow the applied collar to adjust or conform to animals of different sizes, without hanging or leaving a substantial amount of slack around the animal's neck. For larger animals, when the second end of the collar is propelled, the distance it travels will necessarily be limited by the animal's neck, and the terminus of the second end will contact and adhere to the first end of the collar nearer its terminus. In contrast, for smaller animals, the terminus of the second end of the collar will contact and adhere the first end of the collar at a point farther from its terminus, to form a smaller diameter loop. Alternatively, it is envisioned that the collar ends may be joined using cooperating locking buckles or tape.

To prevent inadvertent choking of the animal as might occur if the collar were to become snagged, it is envisioned that the collar may include a weakened and/or breakaway region. Furthermore, unless the animal is to be permanently collared, it is preferred to form the collar or the adherent on its ends from a degradable material, or to include a photo-degradable zone in the collar. This would effectively enable spent collars to fall off the animal, to be replaced by application of a fresh collar in its place.

The collar itself may be adapted for a variety of uses. When intended for control of ectoparasites such as insect and acarine pests, and particularly ticks, the collar should be impregnated or laminated with a suitable conventional pesticide. Alternatively, where the desired result is control of animal populations, it is envisioned that the collars may be impregnated with appropriate animal hormones. Radio transmitters and/or identification indicia may also be included on the collars for tracking or managing animal populations. To prevent repeated collaring of the same animal, the collar may be provided with an electronic transmitter or reflector effective to deactivate trigger 15.

As an alternative to using flexible collars provided with attachable ends, it is also envisioned that the invention may be practiced with collars formed from resiliently coiled materials. In one embodiment, the collar may be formed from a resiliently coiled plastic or metal, which in its normal coiled state forms coils having a diameter approximately equal to the anticipated size of the target animal's neck. The length of the open collar should be slightly greater than the circumference of the material in its normal coiled state to allow the ends to overlap. Materials with sharp edges should be avoided as should materials subject to strong coiling forces to prevent injury to the target animal.

Figure 5:
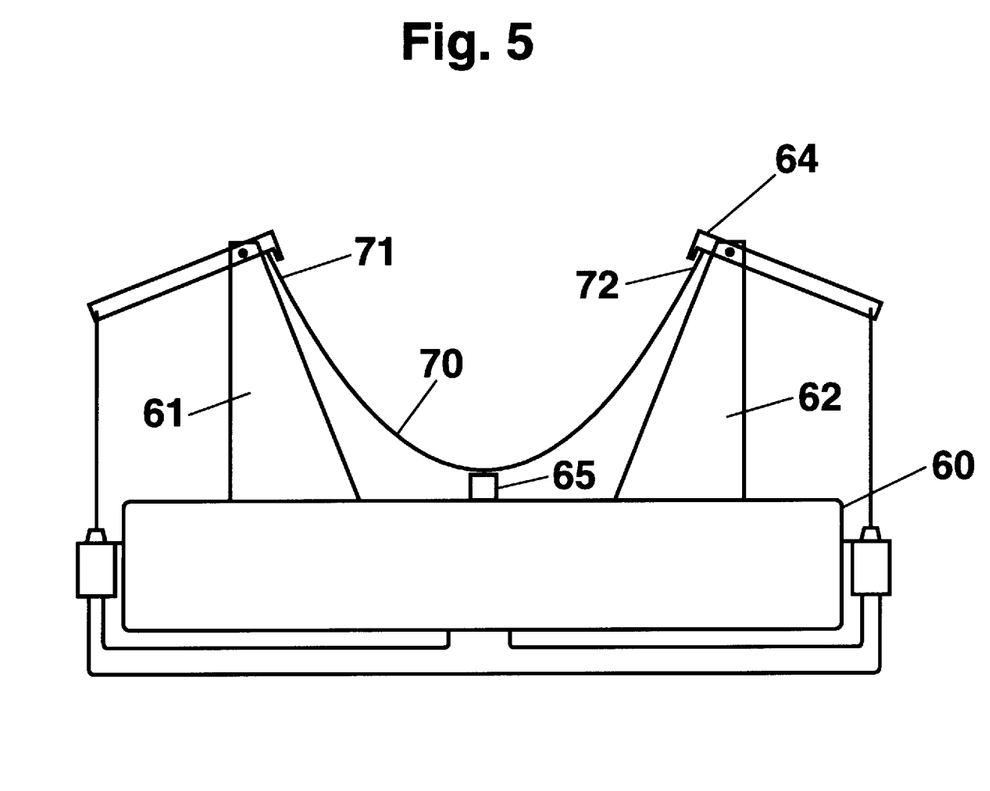
FIG. 5 is an end view of a collaring apparatus of a first alternative embodiment.

FIG. 5 shows an apparatus for applying resiliently coiled collars to animals in accordance with this embodiment. The apparatus includes a support 60 for supporting a collar 70 having first and second ends 71 and 72, respectively, in an open position. The support may be flat for retaining the collar in a flat position, or it may be U-shaped with upright arms 61 and 62 for retaining the collar in a open, yet partially coiled state. The latter configuration enhances proper positioning of the target animal between the ends 71 and 72 of the collar and is therefore preferred. In either event, the support should retain the collar thereon with its ends spaced apart from one another a sufficient distance to allow a target animal to pass its neck therebetween.

A pair of releasable catches 63 and 64 are provided on the support 60, or on arms 61 and 62, adjacent to the collar first and second ends 71 and 72, respectively, which are effective for releasably retaining said first end of said collar on the support. Trigger 65 is provided for activating both of the catches 63 and 64 to release ends of the collar, thereby allowing said collar to close and encircle the neck of the target animal. The catches 63 and 64 and trigger 65 may be constructed and connected in substantially the same manner as described in the device of FIGS. 1 and 2.

In another alternative embodiment, the invention may be practiced with a collar formed from a strip of a resiliently coiled material which when straightened assumes a concave/convex cross section effective for stiffening the strip. The strip is stable in this flat configuration and does not form a coil until the convex cross surface is depressed at a single point. The coil forms with the former convex surface facing radially inwardly and the former concave surface facing radially outwardly. Strips of this same material have been commonly described in the past for use in children's "slap bracelets."

Figure 6:
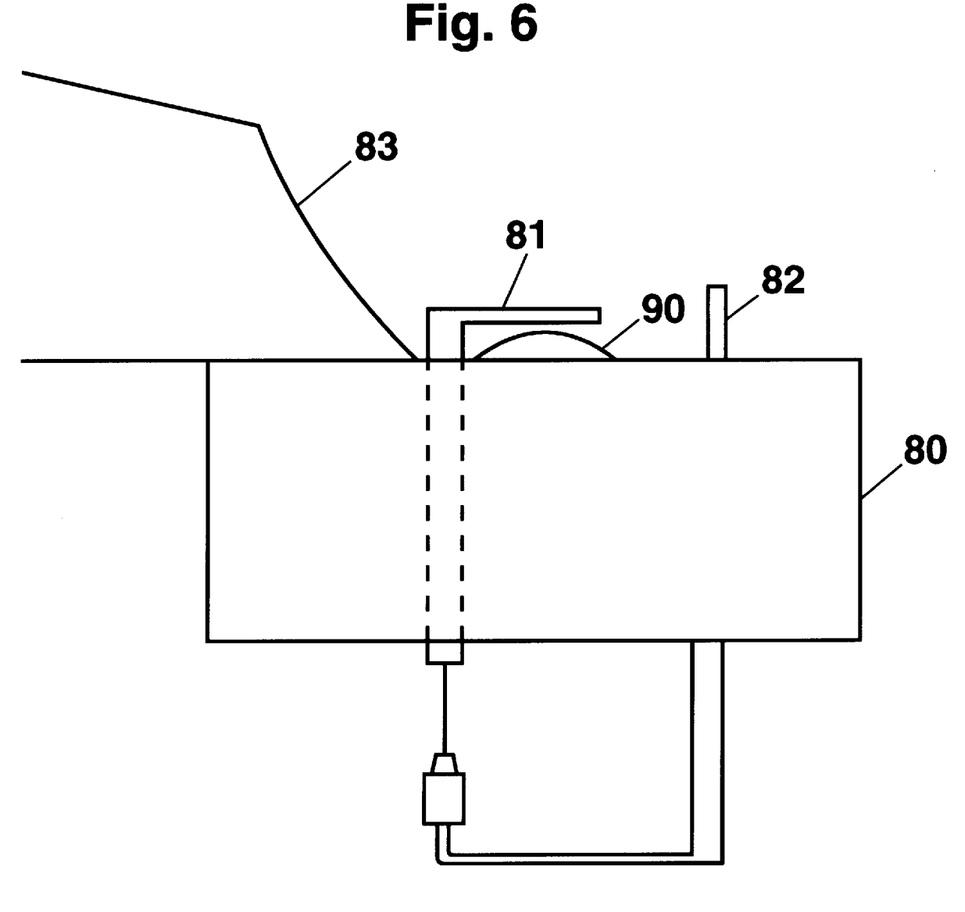
FIG. 6 is a side view of a collaring device of a second alternative embodiment.

An apparatus for application of collars formed from this material is shown in FIG. 6. Like the apparatus for use with the resiliently coiled collars of FIG. 5, this apparatus also includes a support 80 for supporting a collar 90 in an open position. However, because the concave/convex cross section of the material stably maintains the collar in a straight configuration, catches for retaining the collar in an open position are not necessary. Instead, an upwardly and downwardly movable reciprocating arm 81 is provided which is effective for moving downward into contact with and depressing the convex surface of a collar lying on the support, causing the collar to form a coil. Furthermore, the upper surface of support 80 for supporting the collar thereon is preferably substantially flat and approximately horizontal. The collar 90 should be positioned on the support 80 with its convex surface facing up to allow the collar to coil about the neck of a target animal positioned over the support.

As shown in FIG. 6, reciprocating arm 81 is positioned adjacent to the support 80, and includes an approximately horizontal portion which extends above and across at least the portion of the upper surface of the support 80 having the collar 90 thereon. To improve collaring efficiency, the reciprocating arm 81 should be positioned relative to the collar 90 to contact the collar intermediate the ends thereof, preferably near its center. Activation of the reciprocating arm 81 to move downwardly into contact with the collar and cause it to coil is effected by trigger 82. Trigger 82 may be constructed and connected to the reciprocating arm 81 in substantially the same manner as trigger 15 (activating catch 14) described in the device of FIGS. 1 and 2. To ensure proper positioning of the animal's neck above trigger 82 and the center of the collar 90, an optional second shield 83 may be provided. The second shield 83 may be constructed of the same material as shield 36 in the apparatus of FIG. 1, but extends outwardly from the support on each side of the collar 90, leaving an access opening directly over the center of the collar.

In use, the apparatus of the invention is placed in the vicinity or locus of the animal to be collared, and an open collar 20 is placed on the device with its ends separated from one another. Using the devices of FIGS. 1–4, a first end 21 is releasably supported on sizing arm 10, and second end 22 is releasably supported on applicator arm 11. If necessary, a very small amount of adhesive may be placed on the surfaces contacting the ends of collar or on the lower surface of the collar, to prevent inadvertent slippage or removal by gusting winds. The device should be positioned at an appropriate height suitable for the target animal, with the center portion of the collar approximately at or slightly below the height of the neck of the target animal. The target animal is then allowed or caused to place its neck over the collar on the device. Once the animal's neck is in the proper position, the trigger is manually or automatically activated, and the collar propelled about the animal's neck. As described above, when collaring wild animals, it is preferred to attract them to the apparatus by using the apparatus in combination with an appropriate feed, bait, or attractant station.

It is understood that the foregoing detailed description is given merely by way of illustration and that modifications and variations may be made therein without departing from the spirit and scope of the invention.

We claim:

1. An apparatus for the application of an open flexible collar having attachable ends around the neck of an animal comprising:
   a. a sizing arm for releasably supporting a first open end of said collar,
   b. an applicator arm for releasably supporting a second end of said collar spaced apart from said first end and effective for propelling said second end of said collar into contact with said first end, wherein said sizing arm and said applicator arm are spaced sufficiently far apart to allow an animal to place its neck therebetween, and
   c. a trigger for activating said applicator arm to propel said second end of said collar from said applicator arm into contact and engagement with said first end of said collar,
wherein said applicator arm is movable in relation to said sizing arm from a first, cocked position to a second, release position closer to said sizing arm, and further wherein said applicator arm is constructed from a resilient material which is at rest at said second, release position and is deflectable in the direction away from said sizing arm to said first, cocked position.

2. The apparatus of claim 1 further comprising a frame to which said applicator arm and said sizing arm are attached.

3. The apparatus of claim 1 further comprising a catch positioned adjacent to said applicator arm at said first, cocked position, wherein said catch is effective for releasably retaining said applicator arm in said first, cocked position, and said catch is releasable in response to activation of said trigger to allow said applicator arm to spring toward said sizing arm.

4. The apparatus of claim 1 wherein said sizing arm is fixed in an upright position.

5. The apparatus of claim 4 wherein at least the upper portion of said sizing arm is inclined toward said applicator arm, said first end of said collar being releasably supported on the side of said sizing arm facing away from said applicator arm.

6. The apparatus of claim 1 further comprising a frame to which said applicator arm and said sizing arm are attached.

7. The apparatus of claim 6 wherein said sizing arm includes first and second branches diverging from a common point and said sizing arm is pivotally attached to said frame at said common point, said first branch extending upwardly for releasably supporting said first end of said collar thereon, and said second branch extending inwardly toward said applicator arm between said first branch and said applicator arm, such that an animal may pass its neck downwardly between said applicator arm and said first branch to contact and depress said second branch, thereby drawing said first branch closer to said applicator arm and the neck of said animal.

8. The apparatus of claim 1 wherein said trigger is effective for automatically activating said applicator arm in response to the presence of an animal.

9. The apparatus of claim 8 further comprising a frame to which said applicator arm and said sizing arm are attached, and wherein said trigger comprises a pressure sensitive switch or a pressure sensitive plunger, said trigger positioned on said frame between said sizing arm and said applicator arm.

10. The apparatus of claim 1 wherein said trigger is effective for manually activating said applicator arm from a remote location.

11. The apparatus of claim 1 further comprising a receptacle for an animal feed, bait or attractant, said receptacle having bottom and side walls and an opening to allow said animal access to said feed, bait or attractant, wherein said applicator arm and said sizing arm are positioned adjacent to said receptacle above said opening, such that an animal may pass its neck between said applicator arm and said sizing arm to access said feed, bait or attractant through said opening in said receptacle.

12. The apparatus of claim 1 further comprising a frame to which said applicator arm and said sizing arm are attached, and wherein said sizing arm includes first and second branches diverging from a common point and said sizing arm is pivotally attached to said frame at said common point, said first branch extending upwardly for releasably supporting said first end of said collar thereon, and said second branch extending inwardly toward said applicator arm between said first branch and said applicator arm, such that an animal may pass its neck downwardly between said applicator arm and said first branch to contact and depress said second branch, thereby drawing said first branch closer to said applicator arm and the neck of said animal.

13. A method for applying a collar around the neck of a wild animal comprising:
   a. providing the apparatus of claim 1 for the application of an open flexible collar having attachable ends around the neck of an animal;
   b. positioning said apparatus in the locus of an animal to be collared;
   c. providing an open collar on said apparatus with the first end thereof supported on said sizing arm and the second end supported on said applicator arm; and
   d. allowing said animal to place its neck between said applicator arm and said sizing arm whereby said collar is applied around the neck of said animal upon activation of said trigger.

14. An apparatus for applying an open collar formed from a resiliently coiled material to an animal comprising:
   a. a support for supporting said collar having first and second ends in an open position with said ends spaced apart from one another a sufficient distance to allow an animal to pass its neck therebetween,
   b. a first catch positioned on said support for releasably retaining said first end of said collar on said support,
   c. a second catch positioned on said support for releasably retaining said second end of said collar on said support, and
   d. a trigger for activating said first catch and said second catch for releasing said first end and said second end of said collar, thereby allowing said collar to close.

15. The apparatus of claim 14 further comprising a receptacle for an animal feed, bait or attractant, said receptacle having bottom and side walls and an opening to allow said animal access to said feed, bait or attractant, wherein said support is positioned adjacent to said receptacle above said opening, such that an animal may pass its neck over the collar on said support to access said feed, bait or attractant through said opening in said receptacle.

16. A method for applying a collar around the neck of a wild animal comprising:
   a. providing the apparatus of claim 14 for the application of an open collar formed from a resiliently coiled material around the neck of an animal;
   b. positioning said apparatus in the locus of an animal to be collared;

c. providing an open collar formed from a resiliently coiled material on said support with the first end thereof adjacent to and retained by said first catch and the second end adjacent to and retained by said second catch; and d. allowing said animal to place its neck over said collar with its neck between said first end and said second end whereby said collar is applied around the neck of said animal upon activation of said trigger.

17. An apparatus for applying an open collar having first and second ends to an animal, said collar formed from a strip of a resiliently coiled material which when straightened assumes a concave/convex transverse cross section effective for retaining and stiffening said strip, said apparatus comprising:

a. a support for supporting said collar in a straightened position with its convex surface upward and said first and second ends spaced apart, b. a reciprocating arm positioned adjacent said support which is effective for moving into contact with and depressing said convex surface of said collar on said support, and c. a trigger for activating said reciprocating arm to contact and depress said convex surface of said collar and thereby allow said collar to coil.

18. The apparatus of claim 17 further comprising a receptacle for an animal feed, bait or attractant, said receptacle having bottom and side walls and an opening to allow said animal access to said feed, bait or attractant, wherein said support is positioned adjacent to said receptacle above said opening, such that an animal may pass its neck over the collar on said support to access said feed, bait or attractant through said opening in said receptacle.

19. A method for applying a collar around the neck of a wild animal comprising:

a. providing the apparatus of claim 17 for the application of an open collar having first and second ends around the neck of an animal, said collar formed from a strip of a resiliently coiled material which when straightened assumes a concave/convex cross section effective for retaining and stiffening said strip;

b. positioning said apparatus in the locus of an animal to be collared;

c. providing said open collar in a straightened position on said support with the reciprocating arm intermediate said first end and said second end of said collar; and d. allowing said animal to place its neck over said collar with its neck between said first end and said second end whereby said collar is applied around the neck of said animal upon activation of said trigger.

20. A method for applying an open collar around the neck of a wild animal comprising:

a. providing an open collar having first and second ends separated from one another on a support;

b. positioning said support in the locus of an animal to be collared;

c. allowing said animal to place its neck over said collar between said first end and said second end;

d. propelling at least one of said ends of said collar toward the other of said ends and around the neck of said animal.

21. The method of claim 20 further comprising attracting said animal to said apparatus.

22. The method of claim 20 wherein said collar is impregnated with a pesticide.

23. An apparatus for the application of an open flexible collar having attachable ends around the neck of an animal comprising:

a. a sizing arm for releasably supporting a first open end of said collar, b. an applicator arm for releasably supporting a second end of said collar spaced apart from said first end and effective for propelling said second end of said collar into contact with said first end, wherein said sizing arm and said applicator arm are spaced sufficiently far apart to allow an animal to place its neck therebetween, c. a trigger for activating said applicator arm to propel said second end of said collar from said applicator arm into contact and engagement with said first end of said collar, d. a frame to which said applicator arm and said sizing arm are attached, wherein said applicator arm is pivotally attached at a lower end thereof to said frame, with the opposite end of said applicator arm being movable in relation to said sizing arm from a first, cocked position to a second, release position closer to said sizing arm, and e. an accelerant which is adjacent to said applicator arm in said first, cocked position, and which is effective for propelling said applicator arm toward said sizing arm in response to activation of said trigger.

24. The apparatus of claim 23 further comprising a hinge for pivotally attaching said applicator arm to said frame.

25. The apparatus of claim 23 wherein said accelerant is selected from the group consisting of springs, pressurized gas cartridges, and pneumatic cylinders.

26. The apparatus of claim 25 wherein said accelerant is a spring is selected from the group consisting of torsion springs, compression coils, and spiral coils, said spring being positioned adjacent to the side of said applicator arm opposite said sizing arm for thrusting said applicator arm from said first, cocked position toward said sizing arm.

27. The apparatus of claim 26 wherein said accelerant comprises a torsion spring positioned between said frame and said applicator arm such that one end of said torsion spring may contact against said frame and a second end of said torsion spring may contact against said applicator arm when said applicator arm is in said first, cocked position, and one of said first end or said second end is removed from contact against said frame or said applicator arm when said applicator arm is in said second, released position.

28. The apparatus of claim 27 further comprising an extension coil effective for applying a force to retract said applicator arm away from said sizing arm.

29. The apparatus of claim 25 wherein said accelerant is an extension coil spring, said spring being positioned adjacent to the side of said applicator arm facing said sizing arm for pulling said applicator arm from said first, cocked position toward said sizing arm.

30. The apparatus of claim 23 further comprising a receptacle for an animal feed, bait or attractant, said receptacle having bottom and side walls and an opening to allow said animal access to said feed, bait or attractant, wherein said, applicator arm and said sizing arm are positioned adjacent to said receptacle above said opening, such that an animal may pass its neck between said applicator arm and said sizing arm to access said feed, bait or attractant through said opening in said receptacle.

31. The apparatus of claim 23 further comprising a catch positioned adjacent to said applicator arm at said first, cocked position, wherein said catch is effective for releasably retaining said applicator arm in said first, cocked position, and said catch is releasable in response to activation of said trigger to allow said applicator arm to spring toward said sizing arm.

32. The apparatus of claim 23 wherein said sizing arm is fixed in an upright position and at least the upper portion of said sizing arm is inclined toward said applicator arm, said first end of said collar being releasably supported on the side of said collar facing away from said applicator arm.

33. The apparatus of claim 23 wherein said sizing arm includes first and second branches diverging from a common point and said sizing arm is pivotally attached to said frame at said common point, said first branch extending upwardly for releasably supporting said first end of said collar thereon, and said second branch extending inwardly toward said applicator arm between said first branch and said applicator arm, such that an animal may pass its neck downwardly between said applicator arm and said first branch to contact and depress said second branch, thereby drawing said first branch closer to said applicator arm and the neck of said animal.

34. The apparatus of claim 23 wherein said trigger is effective for automatically activating said applicator arm in response to the presence of an animal.

35. The apparatus of claim 34 further comprising a frame to which said applicator arm and said sizing arm are attached, and wherein said trigger comprises a pressure sensitive switch or a pressure sensitive plunger, said trigger positioned on said frame between said sizing arm and said applicator arm.

36. The apparatus of claim 23 wherein said trigger is effective for manually activating said applicator arm from a remote location.

37. An apparatus for the application of an open flexible collar having attachable ends around the neck of an animal comprising:
 a. a sizing arm for releasably supporting a first open end of said collar,
 b. an applicator arm for releasably supporting a second end of said collar spaced apart from said first end and effective for propelling said second end of said collar into contact with said first end, wherein said sizing arm and said applicator arm are spaced sufficiently far apart to allow an animal to place its neck therebetween, and
 c. a trigger for activating said applicator arm to propel said second end of said collar from said applicator arm into contact and engagement with said first end of said collar,
wherein said applicator arm is movable in relation to said sizing arm from a first, cocked position to a second, release position closer to said sizing arm, and said apparatus further comprises a catch positioned adjacent to said applicator arm at said first, cocked position, wherein said catch is effective for releasably retaining said applicator arm in said first, cocked position, and said catch is releasable in response to activation of said trigger to allow said applicator arm to spring toward said sizing arm.

38. The apparatus of claim 37 wherein said catch comprises a pawl or hook positioned adjacent to said applicator arm at said first, cocked position, said catch being movable in response to activation of said trigger from a first position in contact with said applicator arm, to a second position removed from contact with said applicator arm to allow said applicator arm to spring toward said sizing arm.

39. An apparatus for the application of an open flexible collar having attachable ends around the neck of an animal comprising:
 a. a sizing arm for releasably supporting a first open end of said collar,
 b. an applicator arm for releasably supporting a second end of said collar spaced apart from said first end and effective for propelling said second end of said collar into contact with said first end, wherein said sizing arm and said applicator arm are spaced sufficiently far apart to allow an animal to place its neck therebetween, and
 c. a trigger for activating said applicator arm to propel said second end of said collar from said applicator arm into contact and engagement with said first end of said collar,
wherein said applicator arm is fixed and includes an accelerant positioned on the side of said applicator arm facing said sizing arm, said accelerant being effective for thrusting said second end of said collar toward said sizing arm in response to activation of said trigger.

40. The apparatus of claim 39 wherein said accelerant is selected from the group consisting of springs and pneumatic gas cartridges.

41. The apparatus of claim 39 further comprising a receptacle for an animal feed, bait or attractant, said receptacle having bottom and side walls and an opening to allow said animal access to said feed, bait or attractant, wherein said applicator arm and said sizing arm are positioned adjacent to said receptacle above said opening, such that an animal may pass its neck between said applicator arm and said sizing arm to access said feed, bait or attractant through said opening in said receptacle.

42. The apparatus of claim 39 wherein said sizing arm is fixed in an upright position and at least the upper portion of said sizing arm is inclined toward said applicator arm, said first end of said collar being releasably supported on the side of said collar facing away from said applicator arm.

43. The apparatus of claim 39 further comprising a frame to which said applicator arm and said sizing arm are attached, and wherein said sizing arm includes first and second branches diverging from a common point and said sizing arm is pivotally attached to said frame at said common point, said first branch extending upwardly for releasably supporting said first end of said collar thereon, and said second branch extending inwardly toward said applicator arm between said first branch and said applicator arm, such that an animal may pass its neck downwardly between said applicator arm and said first branch to contact and depress said second branch, thereby drawing said first branch closer to said applicator arm and the neck of said animal.

44. The apparatus of claim 39 wherein said trigger is effective for automatically activating said applicator arm in response to the presence of an animal.

45. The apparatus of claim 44 further comprising a frame to which said applicator arm and said sizing arm are attached, and wherein said trigger comprises a pressure sensitive switch or a pressure sensitive plunger, said trigger positioned on said frame between said sizing arm and said applicator arm.

46. The apparatus of claim 39 wherein said trigger is effective for manually activating said applicator arm from a remote location.

47. An apparatus for the application of an open flexible collar having attachable ends around the neck of an animal comprising:
 a. a sizing arm for releasably supporting a first open end of said collar,
 b. an applicator arm for releasably supporting a second end of said collar spaced apart from said first end and effective for propelling said second end of said collar into contact with said first end, wherein said sizing arm and said applicator arm are spaced sufficiently far apart to allow an animal to place its neck therebetween, c. a trigger for activating said applicator arm to propel said second end of said collar from said applicator arm into contact and engagement with said first end of said collar, and d. a frame to which said applicator arm and said sizing arm are attached, wherein said sizing arm includes first and second branches diverging from a common point and said sizing arm is pivotally attached to said frame at said common point, said first branch extending upwardly for releasably supporting said first end of said collar thereon, and said second branch extending inwardly toward said applicator arm between said first branch and said applicator arm, such that an animal may pass its neck downwardly between said applicator arm and said first branch to contact and depress said second branch, thereby drawing said first branch closer to said applicator arm and the neck of said animal.

48. The apparatus of claim 47 further comprising an extension coil connected between said frame and said sizing arm effective for applying a force to retract said first branch of said sizing arm away from said applicator arm when an animal is not present.

49. An apparatus for the application of an open flexible collar having attachable ends around the neck of an animal comprising:

a. a sizing arm for releasably supporting a first open end of said collar, b. an applicator arm for releasably supporting a second end of said collar spaced apart from said first end and effective for propelling said second end of said collar into contact with said first end, wherein said sizing arm and said applicator arm are spaced sufficiently far apart to allow an animal to place its neck therebetween, and c. a trigger for automatically activating said applicator arm in response to the presence of an animal to propel said second end of said collar from said applicator arm into contact and engagement with said first end of said collar, and d. a frame to which said applicator arm and said sizing arm are attached, wherein said trigger comprises a pressure sensitive switch or a pressure sensitive plunger, said trigger positioned on said frame between said sizing arm and said applicator arm.

50. An apparatus for attracting an animal and applying a collar around the neck of said animal comprising:

a. a sizing arm for releasably supporting a first open end of said collar, b. an applicator arm for releasably supporting a second end of said collar spaced apart from said first end and effective for propelling said second end of said collar into contact with said first end, wherein said sizing arm and said applicator arm are spaced sufficiently far apart to allow an animal to place its neck therebetween, c. a trigger for activating said applicator arm to propel said second end of said collar from said applicator arm into contact and engagement with said first end of said collar, and d. a receptacle for an animal feed, bait or attractant, said receptacle having bottom and side walls and an opening to allow said animal access to said feed, bait or attractant, wherein said applicator arm and said sizing arm are positioned adjacent to said receptacle above said opening, such that an animal may pass its neck between said applicator arm and said sizing arm to access said feed, bait or attractant through said opening in said receptacle.

51. The apparatus of claim 50 further comprising a shield positioned about said side walls of said receptacle such that said animal may only access said feed or attractant in said receptacle by passing its neck between said applicator arm and said sizing arm.

* * * * *